United States Patent [19]

Kawaki et al.

[11] Patent Number: 4,910,283

[45] Date of Patent: Mar. 20, 1990

[54] AROMATIC-ALIPHATIC POLYCARBONATE COPOLYMER

[75] Inventors: Takao Kawaki; Sumio Iwao; Nobuhiro Shintani, all of Tokyo, Japan

[73] Assignee: Mitsubishi Gas Chemical Company, Inc., Tokyo, Japan

[21] Appl. No.: 240,894

[22] Filed: Sep. 7, 1988

[30] Foreign Application Priority Data

Sep. 8, 1987 [JP] Japan .................. 62-222965

[51] Int. Cl.$^4$ .............................................. C08G 63/62
[52] U.S. Cl. ..................................... 528/201; 528/204
[58] Field of Search ................................ 528/201, 204

[56] References Cited

U.S. PATENT DOCUMENTS 3,449,298  6/1969  Matzner ............................ 528/201
3,461,097  8/1969  Cotter et al. ..................... 528/201

FOREIGN PATENT DOCUMENTS 3077933  4/1988  Japan ................................ 528/201

Primary Examiner—Harold D. Anderson

Attorney, Agent, or Firm—Sughrue, Mion, Zinn, Macpeak & Seas

[57] ABSTRACT

An aromatic-aliphatic polycarbonate copolymer having a structural unit represented by the formula (1)

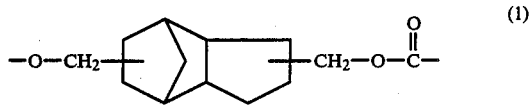

and a structural unit represented by the formula (2)

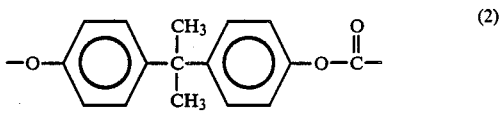

the molar function of the structural unit represented by the formula (1) being 70 to 10%, and the reduced viscosity as determined at 20° C. in a 0.2 g/dl solution of the copolymer in methylene chloride as a solvent being 0.3 to 1.0 dl/g.

2 Claims, 2 Drawing Sheets

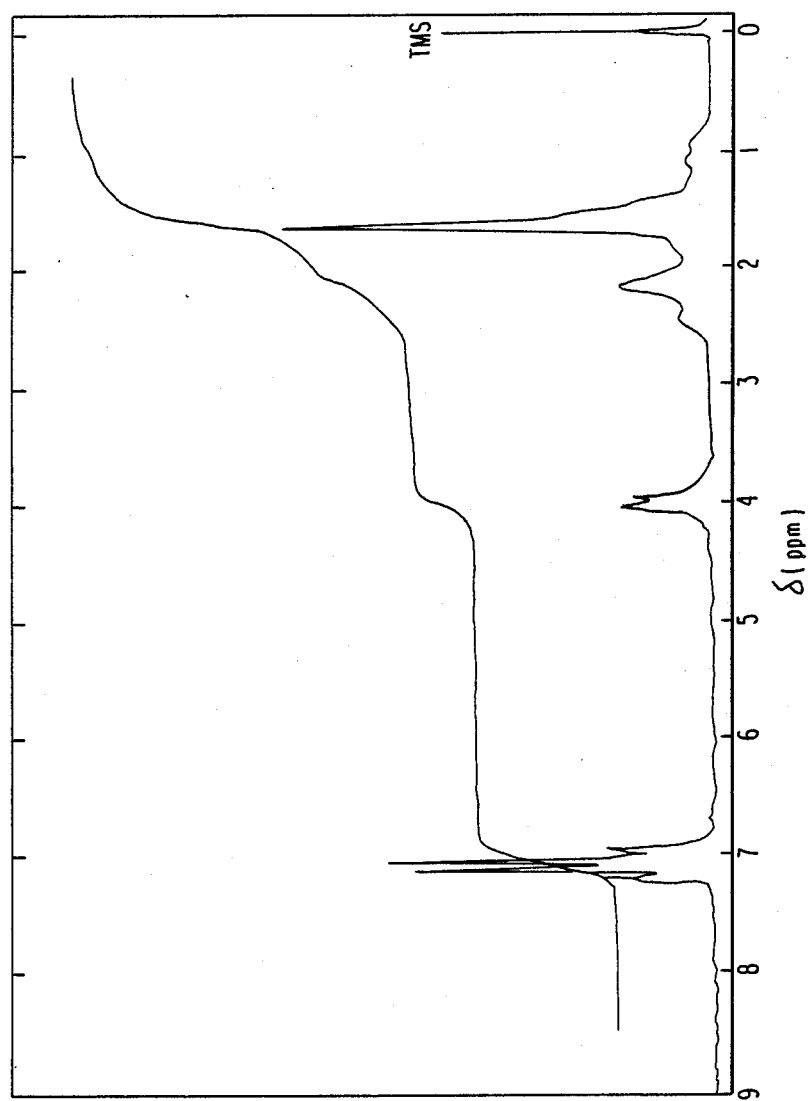
FIG. 1 (NMR)

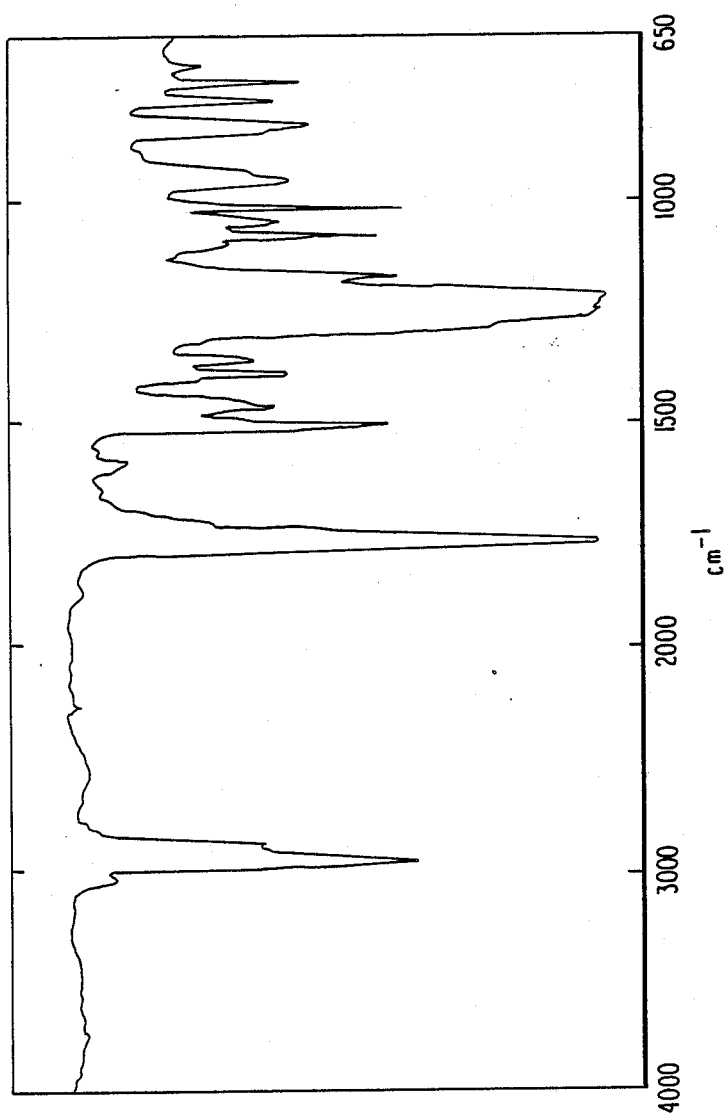
FIG. 2 (IR)

AROMATIC-ALIPHATIC POLYCARBONATE COPOLYMER

FIELD OF THE INVENTION

The present invention relates to an aromatic-aliphatic polycarbonate copolymer and more particularly to a transparent and thermoplastic aromatic-aliphatic polycarbonate copolymer having low water absorption properties, a low photoelastic constant, and a well balanced refractive index and dispersion value, and which is suitable as a plastic optical material for use in production of various lenses, prisms, optical disc substrates and the like.

BACKGROUND OF THE INVENTION

A plastic optical material is used in the production of various lenses, prisms, optical disc substrates and the like because of its transparency, light weight, and excellent molding properties. As such plastic materials, transparent resins such as polymethyl methacrylate, polycarbonate and the like are mainly used (JP-A-56-131654 and JP-A-58-1261119). The term "JP-A" as used herein means an "unexamined published Japanese patent application".

Such plastic optical materials, however, are required to have excellent optical properties such as the balance between a refractive index and a dispersion value, photoelastic constant and the like as well as properties such as transparency, heat resistance, low water absorption properties, mechanical strength, surface hardness and the like. Polymethyl methacrylate has disadvantages that its heat resistance is low and its water absorption is large. The conventional polycarbonate derived from bisphenol A has disadvantages that its photoelastic constant is large, melt fluidity is relatively poor and as a result, a the birefrigence of a molded article increases.

SUMMARY OF THE INVENTION

As a result of investigations to overcome the above problems on the polycarbonate resins, the present inventors have found an aromatic-aliphatic polycarbonate copolymer derived from tricyclo(5.2.1.0$^{2,6}$)decane dimethanol and bisphenol A (=2,2-bis(4-hydroxyphenyl propane).

Accordingly, an object of the present invention is to provide an aromatic-aliphatic polycarbonate copolymer having a structural unit represented by the formula (1)

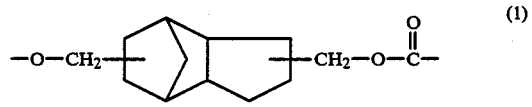

and a structural unit represented by the formula (2)

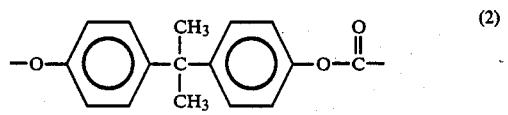

the molar fraction of the structural unit represented by the formula (1) being 70 to 10%, and the reduced viscosity [$\eta$sp/c] (as determined at 20° C. in a 0.2 g/dl methylene chloride solution) thereof being 0.3 to 1.0 dl/g.

BRIEF DESCRIPTION OF THE DRAWINGS

FIG. 1 is a nuclear magnetic resonance spectrum of the aromatic-aliphatic polycarbonate copolymer obtained in Example 1 of the present invention; and FIG. 2 is an infrared absorption spectrum of the same aromatic-aliphatic polycarbonate copolymer as above.

DETAILED DESCRIPTION OF THE INVENTION

The aromatic-aliphatic polycarbonate copolymer of the present invention (hereinafter referred to as the "present copolymer") has a reduced viscosity [$\eta$sp/c] falling within the above specified range of 0.3 to 1.0 dl/g and preferably within the range of 0.3 to 0.8 dl/g. In this measurement, the flow time of the solvent alone in the viscometer is 72.4 seconds. If the reduced viscosity is less than 0.3 dl/g, heat resistance and mechanical strength of the copolymer are poor. On the other hand, if it is more than 1.0 dl/g, moldability of the copolymer is reduced and the residual strain of the resulting molded article is increased.

The present copolymer having the structural units represented by the formulae (1) and (2) includes a random copolymer, a block copolymer, an alternating copolymer and the like. The molar fraction of the structural unit of the formula (1) in the present copolymer should be in the range of 70 to 10 mol%. If the molar fraction is more than 70 mol%, heat resistance of the copolymer is poor. On the other hand, water absorption and the like are increased and furthermore the balance between a refractive index and a dispersion value becomes poor and, therefore, the resulting copolymer is unsuitable for use as an optical material. The present copolymer can be produced, for example, by polycondensing the bischloroformate of 2,2-bis(4-hydroxyphenyl)propane (hereinafter referred to as "BPA") and tricyclo(5.2.1.0$^{2,6}$)decanedimethanol (hereinafter referred to as "TCDM"), or TCDM and BPA in an inert solvent in the presence of an acceptor, or by polycondensing the bischloroformate of TCDM and BPA, or BPA and TCDM, or by polycondensing a mixture of the bischloroformate of BPA and the bischloroformate of TCDM, and BPA and/or TCDM.

As the inert solvent to be used in the present invention, halogenated hydrocarbons such as methylene chloride, chlorobenzene and the like are in general suitably used. In addition, aromatic hydrocarbons such as toluene and the like, and so on can be used. As the acceptor, pyridine, quinoline, dimethylaniline and the like are suitably used. In addition, tert-amines such as triethylenediamine and the like can also be used. In the polycondensation reaction, monohydric alcohols and phenols are usually used as terminators, and the polycondensation reaction is usually carried out at a temperature of 30° C. or less, preferably 0° to 20° C., for a period of 0.3 to 10 hours, preferably 0.3 to 3 hours.

The present invention is described in greater detail by reference to the following Preparation Examples and Examples.

PREPARATION EXAMPLE 1

114 g (0.5 mol) of BPA was suspended in 600 ml of toluene, and 110 ml (1.26 mol) of phosgene was blown thereinto over 1 hour while maintaining the temperature at 0 to 5° C. After completion of blowing, 150 ml (1.20 mol) of N, N-dimethylaniline was added dropwise over 1 hour at the same temperature, and the resulting mixture was then reacted with stirring for 4 hours.

After completion of the reaction, nitrogen gas was blown to remove an excess of unreacted phosgene and most of by-produced hydrogen chloride. The resulting mixture was washed with diluted hydrochloric acid and water in this sequence, and the toluene was distilled away under reduced pressure.

171 g of white crystals (bischloroformate of BPA) having a sweat aroma was obtained (yield: 96.9%). As a result of anaylsis of the chlorine content of the crystals, the purity was 99.0%.

PREPARATION EXAMPLE 2

90 ml (1.26 mol) of phosgene was introduced and dissolved in 500 ml of tetrahydrofuran (hereinafter referred to as "THF") at a temperature of 5° C. or less.

To this solution, a solution of 81.7 g (0.417 mol) of TCDM dissolved in 500 ml of THF was added dropwise over 1 hour at the same temperature, and subsequently the resulting mixture was reacted with stirring for 1 hour at the same tempeature.

After completion of the reaction, nitrogen gas was blown to remove an excess of unreacted phosgene and most of by-produced hydrogen chloride. The tetrahydrofuran was then distilled away under reduced pressure at a temperature of 30° C. or less.

130.4 g of a viscous liquid (bischloroformate of TCDM) having sweat aroma was obtained (yield: 97.5%). As a result of analysis of the chlorine content of the liquid, the purity was 98.5%.

EXAMPLE 1

40.0 g (0.112 mol) of the white crystals obtained in Preparation Example 1 and 0.68 g (0.0045 mol) of p-tert-butylphenol (hereinafter referred to as "PTBP") were dissolved in 320 ml of methylene chloride with stirring, and 20.3 g (0.11 mol) of TCDM was further dissolved therein. The resulting solution was cooled to 0 to 5° C.

A mixture of 80 ml of methylene chloride and 20 ml (0.252 mol) of pyridine was added dropwise over 5 minutes to the above solution while maintaining it at 0° to 5° C., and the resulting mixture was then reacted for 1 hour while stirring.

After completion of the reaction, the reaction product was washed with diluted hydrochloric acid and water in this sequence, and the organic layer thus obtained was poured into 8 liters of methanol to obtain 55.1 g of a white polymer (yield: 95.4%).

Physical properties of the polymer obtained above are shown in Table 1.

The nuclear magnetic resonance spectrum (NMR) and the infrared absorption spectrum of the polymer are shown in FIGS. 1 and 2, respectively.

The following can be seen from the results of FIG. 1 (NMR).

0.6–2.8 ppm alicyclic and H of —$CH_3$: 21.8
3.7–4.5 ppm H of alicyclic adjacent methylene group: 4.0
6.8–7.4 ppm H of aromatic: 8.9

It can be understood that the polymer has a proton ratio of 20:4:8 similar to that of the monomers used.

The following can be seen from the results of FIG. 2 (IR).

3040, 1600, 1500 $cm^{-1}$: aromatic ring
2950, 2880, 1470, 1370 $cm^{-1}$: methyl, methylene group
1760, 1230 $cm^{-1}$: —OCOO—

It can be understood that the polymer is polycarbonate containing both the monomers.

EXAMPLE 2

A polymer was obtained in the same manner as in Example 1 except that 20.3 g (0.056 mol) of TCDM and 12.3 g (0.054 mol) of BPA were used in place of TCDM.

Physical properties of the polymer thus obtained are shown in Table 1.

EXAMPLE 3

A mixture of 36.5 g (0.112 mol) of the bischloroformate of TCDM and 0.68 g (0.0045 mol) of PTBP as obtained in Preparation Example 2 was dissolved in 320 ml of methylene chloride with stirring. In the resulting solution, 20.4 g (0.0896 mol) of BPA and 4.4 g (0.0224 mol) of TCDM were dissolved, and the resulting solution was cooled to 0° to 5° C.

Thereafter the same procedure as in Example 1 was repeated.

Physical properties of the polymer thus obtained are shown in Table 1.

The test results of a BPA homopolymer obtained using PTBP as a terminator are also shown as Comparative Example 1 in Table 1.

The physical properties of Table 1 were measured by the following methods.

Reduced Viscosity [$\eta sp/c$]

Reduced viscosity was determined at 20° C.±0.01 using a 0.2 g/dl solution of the polymer in methylene chloride as a solvent. Flow time of the solvent alone was 72.4 seconds.

Tg (Glass transition temperature)

Measured by using a differential scanning calorimeter.

Q Value (Flow Value)

Measured by using a flow tester (a product of Shimazu Seisakujo Co., Ltd.) under conditions of 1 mm diameter×10 mm length nozzle, 250° C., 120 kg/$cm^2$.

Td (Thermal Decomposition Temperature)

Measured with a thermobalance.

Refractive Index

Measured according to JIS K-7105 by using an Abbe refractometer.

Dispersion Value

Measured by using an Abbe refractometer and indicated in terms of Abbe number.

Photoelastic Constant

Calculated from the results of measurement of birefringence due to change in load as determined at a wavelength of 633 nm using a cast film having a thickness of 20 μm by using Ellipsometer (produced by Mizojiri Kogaku Kogyo Co., Ltd.).

Water Absorption

Measured according to JIS K-7209.

Falling Ball Impact Value

A steel ball was dropped on a 50 mm diameter×3.0 mm thickness test specimen at a distance of 127 cm, and the weight of the ball at which the test specimen was broken was measured. Indicated in the weight of the ball as measured above.

TABLE 1

| | Example | | | Comparative Example |
|---|---|---|---|---|
| | 1 | 2 | 3 | 1 |
| TCDM (mol %) | 50 | 25 | 60 | 0 |

TABLE 1-continued

|  | Example 1 | Example 2 | Example 3 | Comparative Example 1 |
|---|---|---|---|---|
| Reduced Viscosity [ηsp/c] | 0.60 | 0.68 | 0.42 | 0.41 |
| Tg (°C.) | 115 | 131 | 108 | 148 |
| Q Value ($10^{-2}$ cc/sec) | 6.1 | 1.2 | 45 | 9.2 |
| Td (°C.) | 325 | 337 | 313 | 445 |
| Refractive Index | 1.558 | 1.572 | 1.552 | 1.586 |
| Dispersion Value | 40 | 34 | 45 | 30 |
| Constant of Photoelasticity (cm$^2$/dyne) | 4.2 × $10^{-12}$ | 5.6 × $10^{-12}$ | 3.6 × $10^{-12}$ | 7.8 × $10^{-12}$ |
| Water Absorption (%) | 0.07 | 0.10 | 0.06 | 0.15 |
| Falling Ball Impact Value (g) | 112< | 112< | 36 | 67 |

As is apparent from the above detailed description and examples, the aromatic-aliphatic polycarbonate of the present invention has improved water absorption properties, balance between a refractive index and a dispersion value, and optical characteristics such as photoelastic constant and the like while maintaining exellent characteristics such as heat resistance, mechanical strength and the like of polycarbonate. Therefore, the aromatic-aliphatic polycarbonate of the present invention can be suitably utilized as a plastic optical material such as various lenses, prisms, optical disc substrates and the like.

While the invention has been described in detail and with reference to specific embodiments thereof, it will be apparent to one skilled in the art that various changes and modifications can be made therein without departing from the spirit and scope thereof.

What is claimed is:

1. An aromatic-aliphatic polycarbonate copolymer having a repeating structural unit represented by the formula (1)

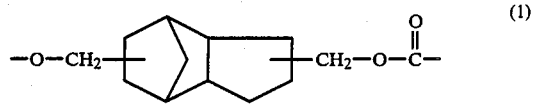

and a repeating structural unit represented by the formula (2)

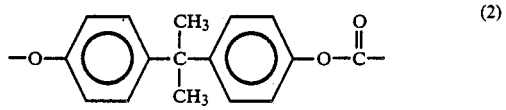

the molar fraction of the repeating structural unit represented by the formula (1) being 70 to 10%, and the reduced viscosity as determined at 20° C. in a 0.2 g/dl solution of the copolymer in methylene chloride as a solvent being 0.3 to 1.0 dl/g.

2. The copolymer as claimed in claim 1, wherein said reduced viscosity is 0.3 to 0.8 dl/g.